United States Patent
Vizer et al.

(10) Patent No.: US 10,430,424 B2
(45) Date of Patent: Oct. 1, 2019

(54) PARAMETER SUGGESTION BASED ON USER ACTIVITY

(71) Applicant: Hewlett Packard Enterprise Development LP, Houston, TX (US)

(72) Inventors: Fernando Vizer, Yehud (IL); Eran Samuni, Yehud (IL); Alon Sade, Yehud (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 354 days.

(21) Appl. No.: 15/033,174

(22) PCT Filed: Oct. 30, 2013

(86) PCT No.: PCT/US2013/067539
§ 371 (c)(1),
(2) Date: Apr. 29, 2016

(87) PCT Pub. No.: WO2015/065379
PCT Pub. Date: May 7, 2015

(65) Prior Publication Data
US 2016/0259791 A1    Sep. 8, 2016

(51) Int. Cl.
G06F 17/30    (2006.01)
G06F 16/2457    (2019.01)
G06F 16/28    (2019.01)
G06F 17/00    (2019.01)
G06F 11/34    (2006.01)
(Continued)

(52) U.S. Cl.
CPC .... *G06F 16/24578* (2019.01); *G06F 11/3452* (2013.01); *G06F 11/3476* (2013.01); *G06F 16/285* (2019.01); *G06F 17/00* (2013.01); *G06Q 30/00* (2013.01); *G06Q 30/02* (2013.01); *G06F 11/3466* (2013.01); *G06F 2201/81* (2013.01); *G06F 2201/86* (2013.01)

(58) Field of Classification Search
CPC .. G06F 17/00; G06F 11/3476; G06F 11/3452; G06F 11/3466; G06Q 30/00
USPC ........................................................ 707/734
See application file for complete search history.

(56) References Cited

U.S. PATENT DOCUMENTS 7,673,340 B1    3/2010    Cohen et al.
8,402,002 B2    3/2013    Adam
(Continued)

OTHER PUBLICATIONS

Korean Intellectual Property Office, International Search Report and Written Opinion, dated Jul. 14, 2014, Daejeon Metropolitan City, Republic of Korea, 4 pages.
(Continued)

*Primary Examiner* — Kuen S Lu

(57) ABSTRACT

A non-transitory, computer readable storage device includes software that, while being executed by a processor, causes the processor to choose, based on user activity, a plurality of candidate parameters to be monitored from a plurality of event messages. Further, the processor executes the software to estimate a level of similarity between the chosen plurality of candidate parameters by computing a similarity score for at least two of the chosen candidate parameters. Still further, the processor executes the software to determine a plurality of parameters from the chosen candidate parameters if the similarity score for the plurality of parameters is greater than a threshold.

13 Claims, 8 Drawing Sheets

(51) Int. Cl.
    *G06Q 30/00* (2012.01)
    *G06Q 30/02* (2012.01)

(56) References Cited

U.S. PATENT DOCUMENTS

| | | | |
|---|---|---|---|
| 8,473,300 | B1 | 6/2013 | Mengibar et al. |
| 9,352,207 | B2* | 5/2016 | Balakrishnan ....... A61B 5/7246 |
| 9,999,825 | B2* | 6/2018 | Shachar .................... G06T 7/20 |
| 2004/0172409 | A1 | 9/2004 | James |
| 2009/0089272 | A1 | 4/2009 | Oliver et al. |
| 2009/0157622 | A1 | 6/2009 | Roberts et al. |
| 2011/0185234 | A1* | 7/2011 | Cohen ................. G06F 11/3476 714/37 |
| 2012/0084282 | A1 | 4/2012 | Chiang et al. |
| 2012/0124047 | A1 | 5/2012 | Hubbard |
| 2012/0216081 | A1 | 8/2012 | Duvvoori et al. |
| 2012/0246303 | A1* | 9/2012 | Petersen ............. G06F 16/1734 709/224 |
| 2014/0172371 | A1* | 6/2014 | Zhu .................... G06F 11/0709 702/185 |

OTHER PUBLICATIONS

Mann, V. et al., Correlating User Activity with System Data for Fast Detection and Diagnosis of System Outages, Aug. 10, 2011, 12 pages.

* cited by examiner

210

(1) 15/05/2013   05:45:34   INFO   [Thread-01] [ApplygetCustomerPayment]   UserID=IRAN09091979, Account=267896675, Amount=1200$, TranID=SMC645475
(3) 15/05/2013   06:47:22   INFO   [Thread-05]   UserID=SIRIA09346595979, Account=267896675, Amount=4200$, [ApplygetCustomerPayment] TranI=DHYU640256
(5) 15/05/2013   09:50:11   INFO   [Thread-02] [ApplygetCustomerPayment]   UserID=USA09091979, Account=26346675, Amount=12560$, TranID=HGD7236356
(7) 15/05/2013   10:50:06   INFO   [Thread-01] [ApplygetCustomerPayment]   UserID=USA09091979, Account=745837, Amount=12300$, TranID=KJH826423
(9) 15/05/2013   11:54:34   INFO   [Thread-07]   UserID=ISRAEL09091979, Account=3451$, Amount=78500$, [ApplygetCustomerPayment] TranIDHNF634120

212

(2) 15/05/2013   05:45:37   INFO   [Thread-01] [getCustomerBalance]   UserID=IRAN09091979, Account=267896675, Balance=1200555$, Region=EMEA
(4) 15/05/2013   06:47:26   INFO   [Thread-05] [getCustomerBalance]   UserID=SIRIA09346595979, Account=267896675, Balance =427700$, Region=EMEA
(6) 15/05/2013   09:51:18   INFO   [Thread-02] [getCustomerBalance]   UserID=USA09091979, Account=26346675, Balance =1290560$, Region=AME
(8) 15/05/2013   10:52:23   INFO   [Thread-01] [getCustomerBalance]   UserID=USA09091979, Account=745837, Balance =344123000$, Region=AME
(10) 15/05/2013   11:55:28   INFO   [Thread-07] [getCustomerBalance]   UserID=ISRAEL09091979, Account=3451$, Balance =78506700$, Region=EMEA FIGURE 2b

| 400 → | | | |
|---|---|---|---|
| 15/05/2013 | 05:44:34 | server='123' | CPU=50% |
| 15/05/2013 | 06:46:22 | server='123' | CPU=70% |
| 15/05/2013 | 09:50:11 | server='123' | CPU=55% |
| 15/05/2013 | 10:49:06 | server='123' | CPU=52% |
| 15/05/2013 | 11:54:00 | server='123' | CPU=100% |

403
```
15/05/2013   05:44:34     server='123'    CPU=50%    401a
(1) 15/05/2013   05:45:34     INFO    [Thread-01] [Apply/getCustomerPayment]     UserID=IRAN09091979,
    Account=267896675, Amount=1200$, TranID=SMC645475
(2) 15/05/2013   05:45:37     INFO    [Thread-01] [getCustomerBalance]     UserID=IRAN09091979,
    Account=267896675, Balance=1200555$, Region=EMEA
```

405
```
15/05/2013   06:46:22     server='123'    CPU=70%    401b
(3) 15/05/2013   06:47:22     INFO    [Thread-05] [Apply/getCustomerPayment]     UserID=SIRIA0934659979,
    Account=267896675, Amount=4200$, TranI=DHYU640256
(4) 15/05/2013   06:47:26     INFO    [Thread-05] [getCustomerBalance]     UserID=SIRIA0934659979,
    Account=267896675, Balance =4277000$, Region=EMEA
```

407
```
15/05/2013   09:50:11     server='123'    CPU=55%
(5) 15/05/2013   09:50:11     INFO    [Thread-02] [Apply/getCustomerPayment]     UserID=USA09091979,
    Account=26346675, Amount=12560$, TranID=HGD7236356
(6) 15/05/2013   09:51:18     INFO    [Thread-02] [getCustomerBalance]     UserID=USA09091979,
    Account=26346675, Balance =1290560$, Region=AME
```

409
```
15/05/2013   10:49:06     server='123'    CPU=52%
(7) 15/05/2013   10:50:06     INFO    [Thread-01] [Apply/getCustomerPayment]     UserID=USA09091979,
    Account=745837, Amount=12300$, TranID=KJH826423
(8) 15/05/2013   10:52:23     INFO    [Thread-01] [getCustomerBalance]     UserID=USA09091979,
    Account=745837, Balance =344123000$, Region=AME
```

411
```
15/05/2013   11:54:00     server='123'    CPU=100%
(9) 15/05/2013   11:54:34     INFO    [Thread-07] [Apply/getCustomerPayment]     UserID=ISRAEL09091979,
    Account=34515, Amount=785000$, TranIDHNF634120
(10) 15/05/2013   11:55:28     INFO    [Thread-07] [getCustomerBalance]     UserID=ISRAEL09091979,
    Account=34515, Balance =7850670$, Region=EMEA
```

FIGURE 4b

PARAMETER SUGGESTION BASED ON USER ACTIVITY

BACKGROUND

The complexity of modern computing system and applications has outpaced human's ability to manage and maintain such systems and associated data at a reasonable cost. The amount of information that people may be interested in is increasing exponentially particularly with the advent of social media. As such, users may be faced with a vast amount of data in order to develop a system and/or diagnose the behavior or health of a system. The amount of such data may be overwhelming.

BRIEF DESCRIPTION OF THE DRAWINGS

For a detailed description of various examples, reference will now be made to the accompanying drawings in which;

FIG. 2b shows an example of generated clusters in accordance with an implementation;

FIG. 4a shows an example of a tracked record provided by an external system in accordance with an implementation;

FIG. 4b shows an example of a rearranged log correlated with the tracked record provided by the external system in accordance with an implementation;

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

In some implementations, a computing system may include a large amount of hardware and/or software components, and the computing system collects human-readable, textual event messages from various of the components into system event log files (also called event logs or logs). The logs can be utilized for any of a variety of purposes such as to develop a system, diagnose the health of a system, and/or understand the behavior of the system.

In general, the logs may be collected through various components. For example, a data center may include hundreds or thousands of server computers, storage devices, network devices, etc. The data center may provide web page servicing, computational services, and other services. The data center may store one or more logs for the various components contained in the data center. Each log may contain information such as failure to start a component or complete an action, security events, or network connection events. A user such as, for example, a network specialist may want to monitor one or more parameters in the logs to identify trends, problems, etc. with the performance of the various components of the data center. The logs, however, may contain voluminous amounts of data, and as such, a user may face a challenging and unmanageable task to identify a particular parameter in the logs that should be monitored. In accordance with the principles disclosed herein, based on user activity, implementations are described to analyze the logs to automatically suggest parameters to be monitored. The disclosed implementations provide an efficient design for a user to be notified automatically of a suggested parameter, based on the user activity, that the user may be interested in monitoring. Monitoring such parameters may help with identification of, for example, performance problems in a data center, determine the health and status of a network of computers, etc.

Figure 1:
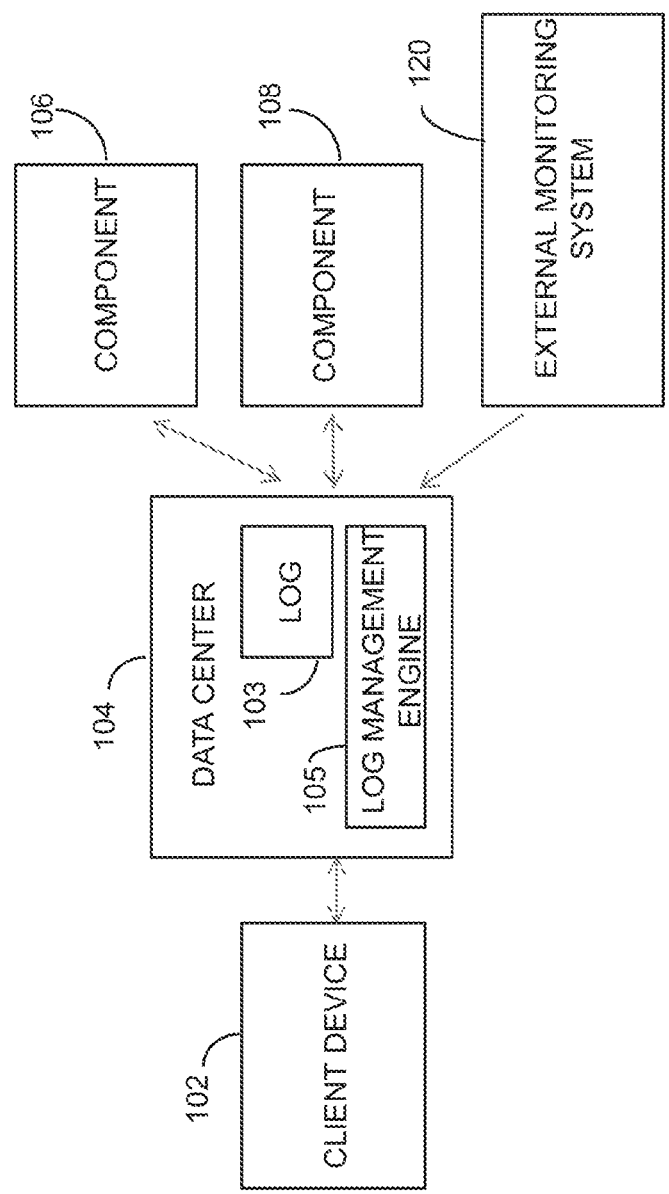
FIG. 1 shows a schematic block diagram of a computing system in accordance with an implementation.

FIG. 1 shows a computing system 100 in accordance with an implementation. The computing system 100 includes a client device 102, a data center 104, a plurality of components 106 and 108, and an external monitoring system 120. Although two components 106, 108 are shown, any numbers of components are possible. The components 106 and 108 may include, for example, a personal computer, a server, a network attached printer, or a network attached storage device. The components 106 and 108 may generate logs, and may be configured to communicate with the data center 104. In general, the data center 104 is configured to store and/or manage logs 103 generated by the components 106 and 108. The external monitoring system 120 may comprise a computer coupled via, for example, a network to the data center. The data center 104 comprises a log management engine 105 to run a management software application to control, manage and configure the environment 100.

The client device 102 is configured to receive input from a user and may communicate with the data center 104 via one or more wired and/or wireless interfaces. The client device 102, the components 106 and 108, the external monitoring system 120, and the data center 104 may communicate with each other within one network. Alternatively, the client device 102, the components 106 and 108, the external monitoring system 120, and the data center 104 may reside in respective networks.

The input received from the user at the client device 102 may include one or more parameters in the various logs that the user may be interested in monitoring. The parameters in the logs may be any of a variety of different types of information. For example, the parameters may include information about financial transactions such as Balance, Transaction Amount, Volume, etc. A user may be interested in tracking the number of transactions made through an Automatic Teller Machine (ATM) for a defined period of time. In this example, component 106 or 108 in FIG. 1 may comprise or couple to the ATM or collection of ATMs. The ATM may cause event log data to be generated and communicate such log data to the data center 104 in the computing system 100. The data center 104 may store the event log data that pertain to the transaction information of the ATM. A user, interested in learning something about the log data, may specify a parameter of potential interest via client device 102. For example, the user may specify the parameter "Transaction Amount." The data center 104 then will retrieve the stored event log(s) to suggest candidate parameter(s) other than the parameter specified by the user to monitor, based on user activity.

Figure 2A:
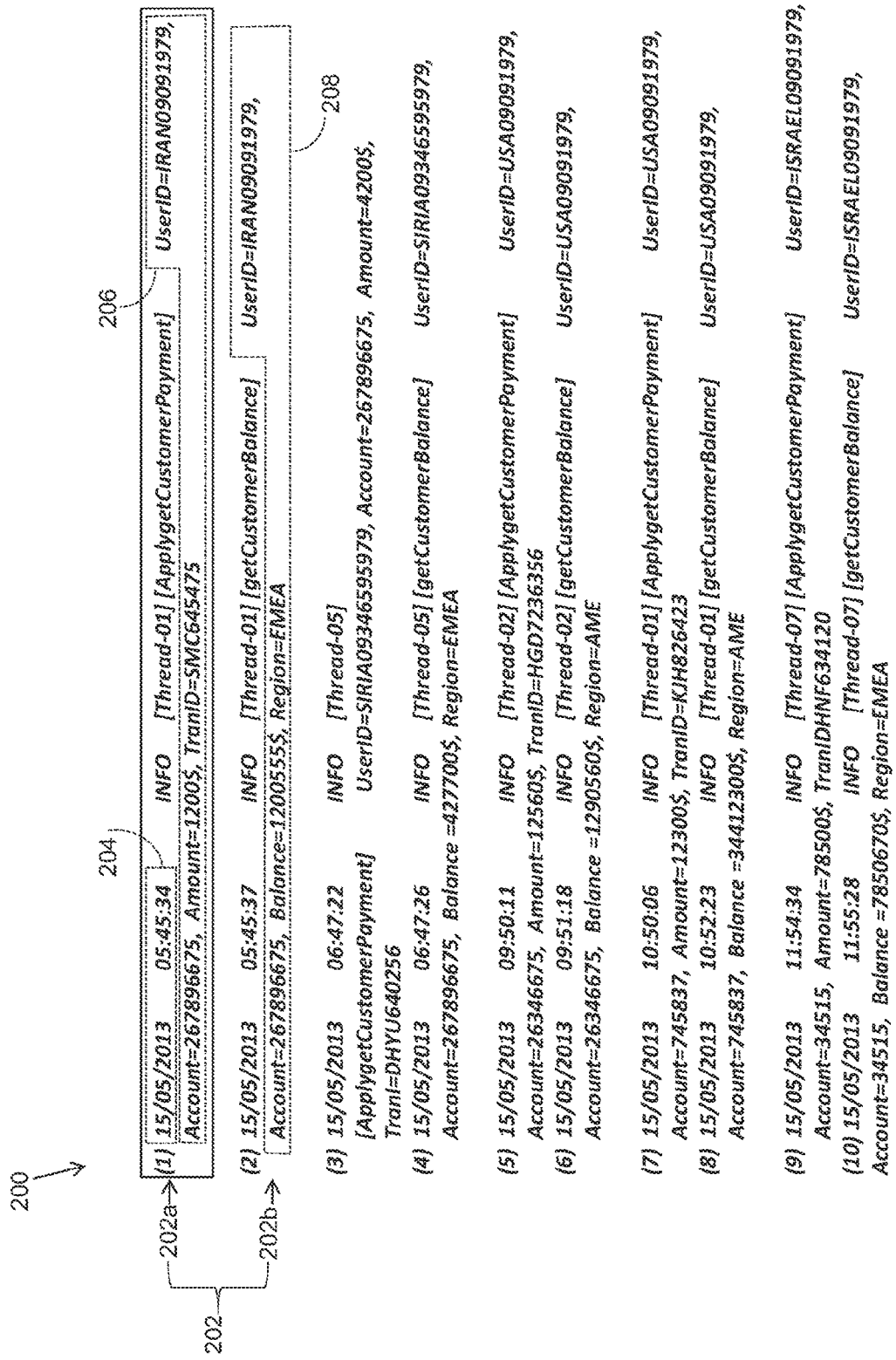
FIG. 2a shows an exemplary event log file in accordance with an implementation.

An example of an event log file 200 is shown in FIG. 2a in accordance with an implementation. A log file may include semi-structured event messages generated automatically when software or hardware components (e.g., 106, 108) output messages describing such information as actions, warnings and errors during their operation. As shown in FIG. 2a, the disclosed illustrative log file 200 includes ten individual event messages 202, where each event message may be collected from one or more components 106, 108 in the computing system 100. The ten event messages are designated as event messages (1)-(10). Each event message 202 may include a timestamp 204, representing the date and time at which the component generates the event message, and a textual narrative 206 providing textual information indicative of the event message. Each textual narrative 206 includes a plurality of alphanumeric text fields, comprising numbers, symbols, and/or variables. In the example of FIG. 2a, the textural narrative 206 of event message 202a includes four textural fields including: UserID, Account, Amount, and TranID. The field Account is followed by a number and the field Amount is followed by a number and a symbol $.

The ten event messages 202 in FIG. 2a do not all contain the same textual information. As noted above, the textual information 206 of event message 202a includes the fields UserID, Account, Amount, and TranID. The textual information 208 of subsequent event message 202b, however, includes the fields UserID, Account, Balance, and Region. In the example of FIG. 2a, each event message 202 has text fields in common with event message 202a or event message 202b. The collection of the particular fields for a given event message is referred to as a "template." The templates depicted in the example of FIG. 2a include:

templateA: UserID=_, Account=_, Balance=_$, Region=_ templateB: UserID=_, Account=_, Amount=_$, TranID=_

In the example shown in FIG. 2a, using templates A and B, the log file 200 can be rearranged into two clusters (e.g., 210, 212), as shown in FIG. 2b. Each cluster is generated by combing event messages sharing a common template. Thus, cluster 210 includes the event messages corresponding to template B and cluster 212 includes the event messages corresponding to template A. If the templates are known in advance by a log management system, the management system can map some or all of the event messages from a log file to one of the known templates.

It can be determined from FIG. 2a that every time an event message corresponding to template A occurs, the next event message (as determined based on the time stamps 204) corresponds to template B. Thus, a pattern, or "atom," is present in the event log. A new classification thus can be generated based on the detected atom by the log management engine 105. In the example of FIG. 2a, an event message corresponding to template B immediately follows and event message corresponding to template A. As such, an atom is detected from events message 202 in FIG. 2a based on template A following template B. The atom maps templates A and B together, recognizing that every time an event message corresponding to template B occurs, the next event message corresponds to template A. The atom is generated and encodes this pattern (template B, then template A). Based on the atom, a classification may be generated to map event message 202: event message (1) and event message (2) together because event message (2) corresponds to template B and it follows event message (1) corresponding to template A. Another classification may be generated to map event message s (3) and (4) together for the same reason, and so on. FIG. 2a lists ten event message s thereby resulting in five classifications based on a common atom. Although two event messages are mapped together by a single classification, based on atoms determined from the event messages, in general more than two event messages may be mapped by a single classification.

In the example of FIG. 2a, only one atom is needed for the log 200 originally having ten individual event message s 202. More generally, the atom is used to identify sets of event messages, or clusters representing the event messages, that tend to occur together or sequentially. In some examples, only one atom is used instead of a set of event messages, which allows for an efficient representation of data, and consequently causes the data center 104 to suggest to the user a parameter to monitor more effectively.

Figure 3:
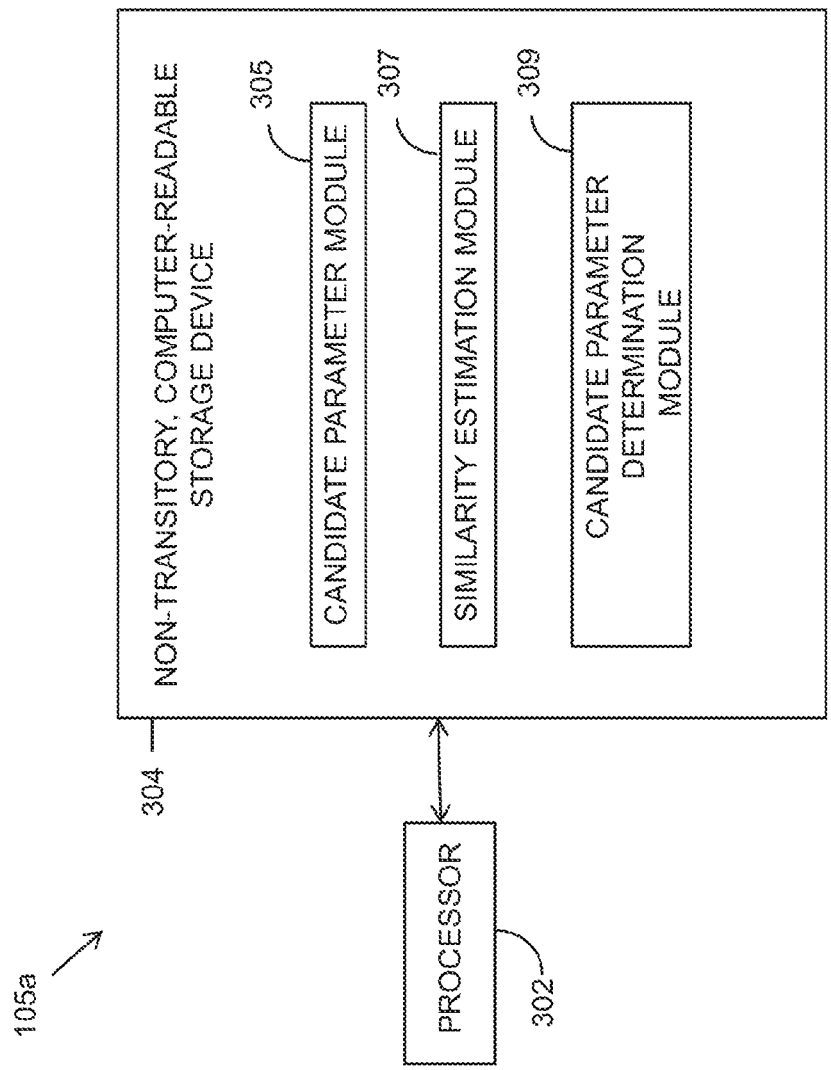
FIG. 3 shows an example of a log management engine in FIG. 1 in accordance with an implementation.

FIG. 3 shows one suitable example of the log management engine 105a in the data center 104 of FIG. 1 in which a processor 302 is coupled to a non-transitory, computer readable storage device 304. The non-transitory, computer-readable storage device 304 may be implemented as volatile storage (e.g., random access memory), non-volatile storage (e.g., hard disk drive, optical storage, solid-state storage, etc.) or combinations of various types of volatile and/or non-volatile storage.

The non-transitory, computer-readable storage device 304 further includes a plurality of software modules configured to perform corresponding functions described herein when executed by processor 302. The software modules include a candidate parameter module 305, a similarity estimation module 307, and a candidate parameter determination module 309.

The processor 302 of the log management engine 105a, in FIG. 3, is configured to execute the candidate parameter module 305 to choose a plurality of candidate parameters from the logs stored in the data center 104. Once the plurality of candidate parameters has been chosen, the processor 302 executes the similarity estimation module 307 to estimate a level of similarity of the chosen candidate parameters. If the processor 302 determines that the level of the similarity for the chosen candidate parameters is high enough (e.g., in excess of threshold) by executing the candidate parameter determination module 309, the log management engine 105a will provide the chosen candidate parameters to the client device 102.

More specifically on the similarity score, the similarity score is estimated based on calculating a correlated coefficient of two sets of data. The correlated coefficient is between −1 and 1. If the coefficient is 1, it means that two sets of data are perfect positive correlation. The calculation of correlated coefficient is based on the formula, $$r_{xy}(\text{correlated coefficient}) = \frac{\sum_{i=1}^{n}(x_i - \bar{x})(y_i - \bar{y})}{\sqrt{\sum_{i=1}^{n}(x_i - \bar{x})^2 \sum_{i=1}^{n}(y_i - \bar{y})^2}}$$

where $\Sigma$ is symbol for sum up; $x_i\text{-}\bar{x}$ is each value in one set of data minus the mean of the set of data; and $y_i\text{-}\bar{y}$ is each value in the other set of data minus the mean of the set of data.

In FIG. 3, while the processor 302 executes the candidate parameter module 305, the log management engine 105a chooses the candidate parameters from the stored logs in any of multiple ways. For example, the log management engine 105a may choose a candidate parameter by searching through multiple clusters of event messages (e.g., clusters 210 and 212) or through an organized classification based on a detected atom. Also, the log management engine 105a may choose a candidate parameter based on a correlation of the log stored in the data center 104 to a tracked record provided by the external monitoring system 120. Additional information regarding the choosing of the candidate parameters are provided below.

The candidate parameter module 305 executed by the processor 302 is configured to classify the logs stored in the data center 104 into clusters based on a detected template, and/or into classifications based on a detected atom, as shown in FIGS. 2a and 2b. In some implementations, the clusters or classifications may be stored in the non-transitory, computer-readable storage device 304 for the module 302 to use.

In some implementations, the user may specify a parameter to monitor at the client device 102, and the specified parameter then may be transmitted by the client device 102 to the log management engine 105a in the data center 104. Upon reception of the specified parameter, the processor 302 executes the candidate parameter module 305 to search for candidate parameters in the clusters or classifications stored in the storage device 304. The candidate parameters are parameters that the log management engine 105a determines to be optimal choices for the user to monitor based on the parameter(s) specified by the user. The candidate parameters may either be: synonymous to the parameter specified by the user, have a similar neighboring symbol of the specified parameter, or in the same classification as the specified parameter.

For example, referring to FIG. 2b, the user is aware that the log management engine 105a in the data center 104 manages a log file related to banking transactions. The user may be interested in a particular bank transaction parameter to monitor, Amount. Via client device 102 the user specifies the parameter Amount. Through execution of the module 305 by the processor 302, the log management engine 105a may, based on recognition that Amount is in the cluster 210, search for a template in other clusters comprising the parameter "Amount=_$." Further, the log management engine 105a may search for a template in other clusters comprising a synonym to "Amount" such as, "Sum," "Volume," etc., and/or a similar or identical neighboring symbol (e.g., $) to the recognized template. The neighboring symbol may refer to as a symbol within a reasonable text numbers of a parameter, such as "Sum=_$," "Volume=_$." For example, the log management engine 105a may choose a candidate parameter to be suggested to the user from a searched template like, Customer_ finished the transaction. Volume=_$.

As such, in addition to the parameter "Amount" specified by the user to monitor, the log management engine 105a may choose "Volume" from the log as a candidate parameter. In some implementations, the log management engine 105a may look up a list including words grouped together according to similarity of meaning (e.g., synonym), and the log management engine 105a detects if any of the synonyms are used in the event messages. If the log management engine 105a detects that a synonym is used in the event messages, the log management engine 105a may suggest the detected synonym along with the parameter initially specified by the user.

Further, the log management engine 105a may also choose a candidate parameter from a common classification based on a detected atom that comprising the parameter specified by the user. Using the example given in FIG. 2a, the classification mapping event message (1) and event message (2) together is generated by the processor 302 executing the candidate parameter module 305. In the classification of event messages (1) and (2), the classification comprises not only the specified parameter, "Amount," but also fields such as Balance and Account. Based on the classification, the log management engine 105a may choose Balance, and/or Account as candidate parameters as well to suggest to the user.

In the preceding example, the user specifies an input parameter of interest at the client device 102 to be monitored, and the log management engine 105 suggests additional parameter(s) to be monitored as well. In the following example, the user need not specify an input parameter of interest. Instead, the log management engine 105 detects one or more parameters which the user may be interested in monitoring by correlating tracked records, provided by the external monitoring system 120, to the log. As such, the log management engine 105 automatically causes the user to be aware of monitoring certain parameters that should be tracked.

Referring to the choosing of candidate parameters based on the correlation to the external monitoring system 120, the external monitoring system 120 is known and may be implemented using a process, business performance management (BPM), or implemented as a real user monitoring (RUM). The BPM is used to continuously measure synthetic transactions in order to improve business effectiveness and efficiency. The RUM is a passive monitoring technology, which can be used to collect web traffic without affecting the operation of the website in which the RUM is monitoring.

In some implementations, the external monitoring system 120 may provide a tracked record that has been continuously monitored by the external system 120, and transmit the record to the data center, Further, the processor 302 of the log management engine 105a in FIG. 3 may execute the module candidate parameter module 305 to correlate the record, based on a time-correlation, to the log stored in the data center 104, or to the clusters or classifications stored in the storage device 304. Based on the correlation, the log management engine 105a may choose a candidate parameter from the log to suggest the user to monitor. An example is provided below.

FIG. 4a shows an example of a tracked record set 400 provided by the external monitoring system 120. As shown in FIG. 4a, the tracked record set 400 includes a plurality of records 401, and each record (e.g., 401) has a timestamp and a description of usage for a particular server. For example, CPU usage for sever 123 has been monitored by the external system 120 at each given timestamp. For example, at 06:46:22, May 15, 2013, the CPU usage for the server 123 was 70%.

Still referring to FIG. 4a, in some implementations, when the log management engine 105a in FIG. 3 receives the tracked record 400 pertaining to the CPU usage of the server 123 over time, the log management engine 105a may correlate the record set 400 to the clusters or classifications (e.g., event message (1) and event message (2) in FIG. 2a) stored in the storage device 304. In some implementations, the correlations are performed based on time such as by using the time stamps.

The time stamps of records 401 in FIG. 4a match fairly closely with at least some of the time stamps of the event messages 202 in FIG. 2a. FIG. 4b shows an example of records 401 arranged in combination with the event messages 202 from FIG. 2a in accordance with an implementation. As shown in FIG. 4b, according to a time-based correlation between each record 401 and each of the classification (i.e., event message (1) and event message (2) in FIG. 2a) detected by the processor 302 executing the candidate parameter module 305, each record 401 has a time stamp that is generally commensurate, but just before the classification comprising a pair of corresponding event messages (e.g., event messages (1) and (2)). For example, the record 401a with the time stamp of May 15, 2013 and 5:44:34 occurs just before the time stamps for event messages (1) and (2). Thus, classification 403 includes all three of record 401a and event messages (1) and (2). Similarly, the record 401 with the time stamp of May 15, 2013 and 6:46:22 occurs just before the time stamps for event messages (3) and (4) as shown, and so on. Thus, classification 405 includes all three of record 401b and event messages (3) and (4). Classifications 407, 409, and 411 are similarly formed.

Still referring to FIG. 4b, the log management engine 105a, through processor 302 executing the candidate parameter module 305, identifies that the CPU usage over time has a similar trend as the Amount over time. More specifically, the CPU usage shows a trend that the usage changes from 50% to 100% gradually from classification 403 to 411 except for a sudden change to 70% at 405, by which the trend also exists for the Amount. The Amount also gradually changes from 403 to 411 except for an abnormal change of the Amount at 405. Consequently, that the log management engine 105a may choose Amount, without being specified by the user, as the candidate parameter to be monitored automatically based on the identified time-correlation between the CPU usage and the Amount.

Referring again to FIG. 3, the processor 302 executing the candidate parameter module 305 may cause the log management engine 105a to choose one or more candidate parameters from the logs by using one of the methods described herein, or a different method. Once the log management engine 105a has chosen the candidate parameters, the processor 302 may execute the similarity estimation module 307 to estimate a level of similarity of each candidate parameter by calculating a similarity score. More particularly, the similarity score is calculated based on the correlated coefficient described above. The similarity scores then may be used to determine which candidate parameters are synonymous to the parameter specified by the user so that additional parameters can be suggested to the user for subsequent monitoring.

Based on the similarity score calculated by executing the similarity estimation module 307, the processor 302 executes the candidate parameter determination module 309 to determine if the candidate parameter should be provided to the user to monitor. In some implementations, if the similarity score for a candidate parameter is larger than a threshold, the log management engine 105a will provide and transmit the candidate parameter to the client device 102 for the user to monitor or have monitored. The threshold may be predetermined by the log management engine 105a or manually set by the user.

Figure 5:
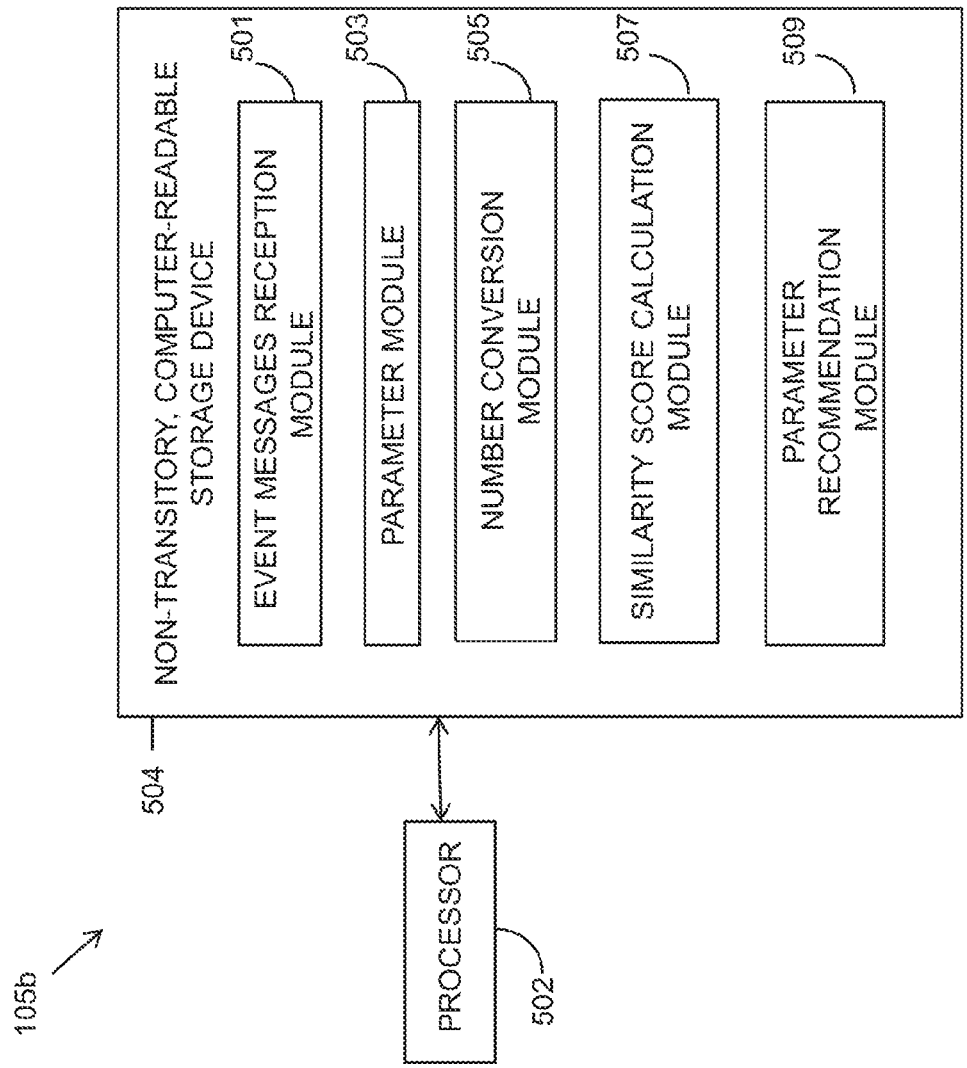
FIG. 5 shows another example of a log management engine in FIG. 1 in accordance with an implementation.

FIG. 5 shows another implementation 105b of the log management engine 105 of the data center 104 in FIG. 1. The illustrative log management engine 105b includes a processor 502 coupled to a non-transitory, computer readable storage device 504. The non-transitory, computer-readable storage device 504 may be implemented as volatile storage (e.g., random access memory), non-volatile storage (e.g., hard disk drive, optical storage, solid-state storage, etc.) or combinations of various types of volatile and/or non-volatile storage.

The non-transitory, computer-readable storage device 504 further includes a plurality of software modules configured to perform corresponding functions when executed by the processor 502. The non-transitory, computer-readable storage device 504 includes an event message reception module 501, a parameter module 503, a number conversion module 505, a similarity score calculation module 507, and a parameter recommendation module 509.

The log management engine 105b is configured to receive a plurality of logs or event messages (e.g., 200 in FIG. 2a) from one or more components (e.g., 106 and 108) in the computer 100, by the processor 502 executing the event message reception module 501. After receiving the logs, the logs may be stored in the non-transitory, computer-readable storage device 504, which are accessible by causing the processor 504 to execute a software module.

To choose parameters to monitor from the logs, the processor 502 may execute the parameter module 503 to perform the choosing of candidate parameters as described above. Once the log management engine 105b has chosen the parameters to monitor, the processor 502 may execute the number conversion module 505 to convert the parameters in the logs from a textual or semi-textural strings to number-based metrics, and to generate a map over time for each of the metrics illustrating how each such metric changes over time. Further, by the processor 502 executing the similarity score calculation module 507, the log management engine 105b calculates the similarity score for the converted metrics corresponding to the parameters in the log. If the engine log management 105b, by the processor 502 executing the parameter recommendation module 509, determines that the similarity is score is greater than a predefined threshold, the log management engine 105b will transmit and recommend the chosen parameters to the client device 102 for the user to monitor.

Figure 6:
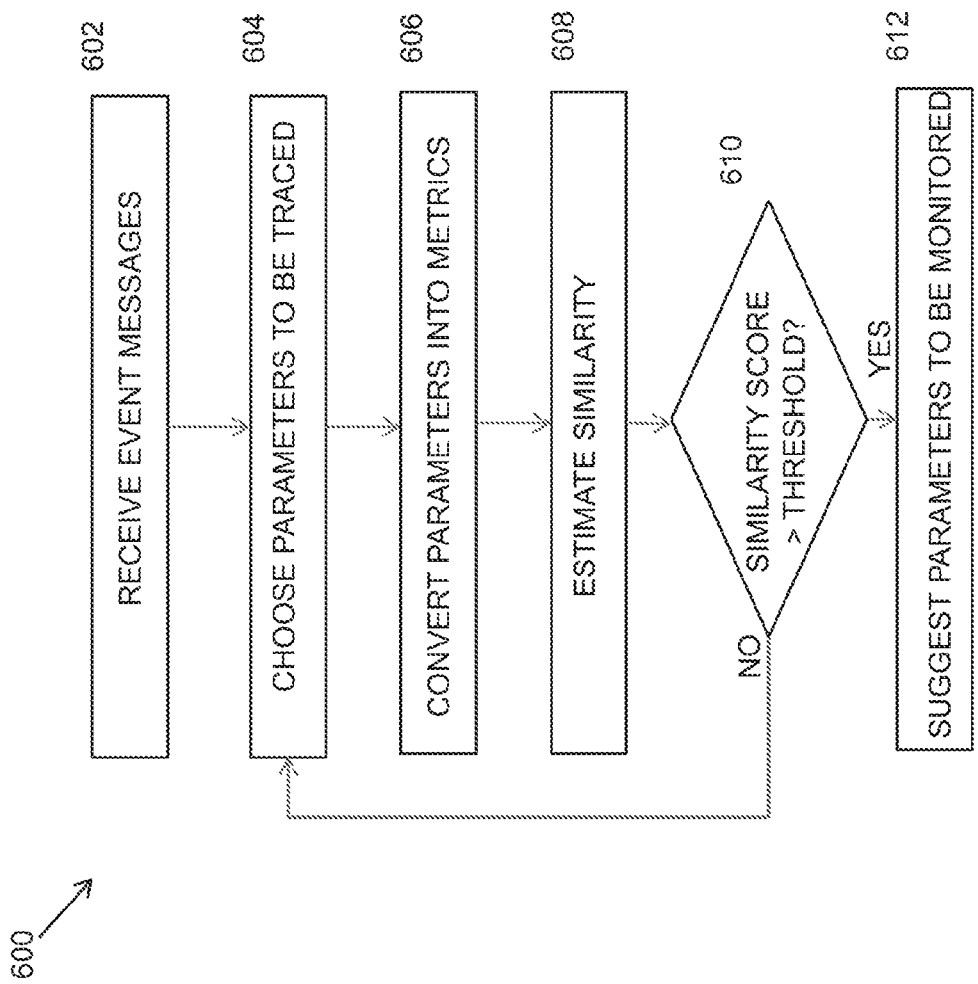
FIG. 6 shows a method for suggesting a parameter to be monitored in accordance with an implementation.

FIG. 6 shows a method 600 for suggesting a parameter to be monitored in accordance with an implementation. The method 600 starts with block 602 by which a plurality of event messages are received from one or more components (e.g., 106 and 108) in the computer system environment 100. The event messages may be received by the log management engine 105 in the data center 104.

Subsequently, in block 604, the data center 104 (e.g., the log management engine 105) chooses a plurality of parameters from the event messages based on the user activity. The method 600 continues with block 606 in converting or transducing the textural or semi-textural parameters chosen in block 604 into number-based metrics. At block 608, the log management engine 105 in the data center 104 estimates a similarity score for the metrics corresponding to the chosen parameters.

Based on the similarity score estimated at block 608, at block 610, the data center 104 determines that if the similarity score is greater than a threshold. If the similarity score is greater than the threshold, the method 600 continues with block 612 in suggesting the parameters that has been chosen at block 604 for the user to monitor. If the similarity score is not greater than the threshold, the method 600 flows back to the block 604.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method, comprising:
receiving, by a system comprising a hardware processor, a plurality of event messages associated with a computer event log;
based on user activity, choosing, by the system, a plurality of parameters to be tracked in the event messages, wherein choosing the plurality of parameters comprises:
analyzing the plurality of event messages to determine templates for the event messages;
organizing the plurality of event messages into a plurality of clusters based on the determined templates;
computing a time correlation between the determined templates;
generating a pattern based on the time correlation;
generating a classification based on the pattern, the classification comprising a cluster;
converting, by the system, the chosen plurality of parameters into numeric-based metrics;
estimating, by the system, a similarity score based on values of the numeric-based metrics, the similarity score estimating a level of similarity between the chosen plurality of parameters;
in response to the similarity score being greater than a threshold, suggesting, by the system, a given parameter of the chosen plurality of parameters to be monitored in the event messages; and
monitoring the given parameter to diagnose a health of the system.

2. The method of claim 1, wherein choosing the plurality of parameters comprises:
searching for a parameter in the plurality of clusters that is determined to be synonymous to a parameter specified by a user to monitor.

3. The method of claim 1, wherein choosing the plurality of parameters comprises:
computing a time-based correlation of a parameter being monitored to the chosen plurality of parameters to be tracked.

4. The method of claim 1, wherein the similarity score is computed based on a value of the numeric-based metric corresponding to the given parameter and a value of the numeric-based metric corresponding to another of the chosen plurality of parameters.

5. A non-transitory computer readable storage medium storing instructions that when executed cause a system to:
choose, based on user activity, a plurality of candidate parameters to be monitored from a plurality of event messages, wherein choosing the plurality of candidate parameters comprises:
analyzing the plurality of event messages to determine templates for the event messages;
organizing the plurality of event messages into a plurality of clusters based on the determined templates;
computing a time correlation between the determined templates;
generating a pattern based on the time correlation;
generating a classification based on the pattern, the classification comprising a cluster; and
choosing a parameter from the generated classification;
estimate a level of similarity between the chosen plurality of candidate parameters by computing a similarity score based on values corresponding to the chosen plurality of candidate parameters;
select a parameter from the chosen plurality of candidate parameters in response to the similarity score for the selected parameter being greater than a threshold; and
monitor the selected parameter to diagnose a health of the system.

6. The non-transitory computer readable storage medium of claim 5, wherein choosing the plurality of candidate parameters comprises:
searching for a parameter in the plurality of clusters that is synonymous to a parameter specified by a user to monitor.

7. The non-transitory computer readable storage medium of claim 5, wherein choosing the plurality of candidate parameters to be monitored comprises:
identifying the candidate parameters from the plurality of clusters based on a user preference in a specified parameter.

8. The non-transitory computer readable storage medium of claim 5, wherein the similarity score is computed based on a value corresponding to the selected parameter and a value corresponding to another of the plurality of candidate parameters.

9. A non-transitory computer readable storage medium storing instructions that when executed cause a system to:
receive a plurality of event messages from a server;
choose a plurality of parameters in the event messages to be tracked, according to user activity, wherein choosing the plurality of parameters comprises:
analyzing the plurality of event messages to determine templates for the event messages;
organizing the plurality of event messages into a plurality of clusters based on the determined templates;
computing a time correlation between the determined templates;
generating a pattern based on the time correlation; and
generating a classification based on the pattern, the classification comprising a cluster;
convert the chosen plurality of parameters into numbers;
calculate a similarity score based on the numbers, the similarity score estimating a level of similarity between the chosen plurality of parameters;
in response to the similarity score being greater than a threshold, recommend a given parameter in the event messages to be monitored; and
monitor the given parameter to diagnose a health of the system.

10. The non-transitory computer readable storage medium of claim 9, wherein the instructions when executed cause the system to:
choose a parameter from the plurality of clusters that is synonymous to a user's interested parameter in the event messages.

11. The non-transitory computer readable storage medium of claim 10, wherein choosing the plurality of parameters in the event messages to be tracked comprises:
choosing a parameter from the generated classification.

12. The non-transitory computer readable storage medium of claim 9, wherein choosing the parameters in the event messages to be tracked comprises:
estimating a time-based correlation of a parameter being monitored to the chosen plurality of parameters.

13. The non-transitory computer readable storage medium of claim 9, wherein the similarity score is computed based on a number corresponding to the given parameter and a number corresponding to another of the chosen plurality of parameters.

* * * * *